United States Patent
Dong et al.

(10) Patent No.: US 12,210,925 B2
(45) Date of Patent: Jan. 28, 2025

(54) RFID TAG AND PROCESSING METHOD THEREFOR

(71) Applicants: QINGDAO HIGHWAY IOT TECHNOLOGY CO., LTD., Qingdao (CN); MESNAC CO., LTD., Qingdao (CN)

(72) Inventors: Lanfei Dong, Qingdao (CN); Yong Yao, Qingdao (CN); Haijun Chen, Qingdao (CN)

(73) Assignees: QINGDAO HIGHWAY IOT TECHNOLOGY CO. , LTD., Qingdao (CN); MESNAC CO., LTD., Qingdao (CN)

( * ) Notice: Subject to any disclaimer, the term of this patent is extended or adjusted under 35 U.S.C. 154(b) by 54 days.

(21) Appl. No.: 17/928,069

(22) PCT Filed: Apr. 16, 2021

(86) PCT No.: PCT/CN2021/087822
§ 371 (c)(1),
(2) Date: Nov. 28, 2022

(87) PCT Pub. No.: WO2021/238497
PCT Pub. Date: Dec. 2, 2021

(65) Prior Publication Data
US 2023/0196055 A1    Jun. 22, 2023

(30) Foreign Application Priority Data
May 28, 2020   (CN) .......................... 202010470302.0

(51) Int. Cl.
*G06K 19/077* (2006.01)
*G06K 19/07* (2006.01)

(52) U.S. Cl.
CPC ... *G06K 19/07764* (2013.01); *G06K 19/0723* (2013.01); *G06K 19/07724* (2013.01); *G06K 19/07775* (2013.01)

(58) Field of Classification Search
CPC ......... G06K 19/0775; G06K 19/07764; G06K 19/07775; G06K 19/07749; B60C 23/0452; H01Q 9/16
See application file for complete search history.

(56) References Cited

U.S. PATENT DOCUMENTS

2006/0097870 A1*  5/2006  Choi ........................ H01Q 1/36
                                                               340/572.1
2008/0192451 A1*  8/2008  Sinnett ................. H05K 3/3426
                                                                  361/776

(Continued)

FOREIGN PATENT DOCUMENTS

| CN | 102017343 | 4/2011 |
| CN | 101054194 | 5/2011 |
| CN | 103068598 | 4/2013 |

*Primary Examiner* — Mirza F Alam
(74) *Attorney, Agent, or Firm* — Jiwen Chen; Joywin IP Law PLLC

(57) ABSTRACT

The present invention provides an RFID tag and a processing method for an RFID tag. The RFID tag is mainly applied to a rubber product. The RFID tag includes: a substrate, a chip and an antenna; a chip is arranged on a substrate, wherein the chip has a predetermined code thereon to enable a reader to identify; an antenna, in which the antenna is in a communication connection with a chip, and is configured for transmitting a radio frequency signal between the chip and a reader; the substrate is further provided with a connecting part, and the antenna is connected to the substrate through the connecting part. The RFID tag in the present invention solves the problem in the related art that a substrate in a RFID tag is not reliably connected to an antenna.

11 Claims, 2 Drawing Sheets

(56) References Cited

U.S. PATENT DOCUMENTS

| | | | |
|---|---|---|---|
| 2008/0252425 A1* | 10/2008 | Okegawa | H01Q 1/2225 340/572.1 |
| 2011/0063184 A1* | 3/2011 | Furumura | H01Q 7/00 343/856 |
| 2013/0153669 A1* | 6/2013 | Sinnett | G06K 19/07764 235/492 |

* cited by examiner

RFID TAG AND PROCESSING METHOD THEREFOR

CROSS-REFERENCE TO RELATED APPLICATION

This application claims priority to Chinese Patent Application No. 202010470302.0, filed with the CNIPA on 28 May 2020 and entitled "RFID Tag and Processing Method for RFID Tag".

TECHNICAL FIELD

The present invention relates to the technical field of tire, and in particular, to an RFID tag and a processing method for an RFID tag.

BACKGROUND TECHNOLOGY

RFID (radio frequency identification) is a non-contact automatic identification technology, which automatically identifies a target object by means of a radio frequency signal and acquires relevant data. The identification work does not need manual intervention, and can work in various harsh environments. The RFID technology can identify high-speed moving objects and can identify a plurality of chips at the same time, and the operation is quick and convenient. An RFID system is composed of three parts: 1. an RFID tag, which is composed of a substrate, an antenna and a chip; 2. a reader, a device for reading and writing RFID tag information; 3. a read/write antenna for transmitting a radio frequency signal between the RFID tag and the reader. The above-mentioned system is widely used in rubber products for recording relevant information.

During specific installation and use, a substrate and an antenna in an RFID system are superimposed and welded together, and then are implanted into a rubber product; however, the rubber product is deformed during manufacturing and use, and the phenomenon of deflection and deformation of a structure occurs, which results in that the connection between the antenna and the substrate is not reliable, and separation easily occurs; however, after the antenna is separated from the substrate, a reader cannot read information about the rubber product, which is very inconvenient.

SUMMARY OF INVENTION

The main purpose of some embodiments of the present invention is to provide an RFID tag and a processing method for an RFID tag, so as to solve the problem in the related art that the connection between a substrate and an antenna in an RFID tag is unreliable.

In order to achieve the described object, according to one embodiment of the present invention, provided an RFID tag, which is applied to a rubber product. The RFID tag includes: a substrate, a chip and an antenna, wherein the chip is arranged on the substrate, and a predetermined code is provided on the chip so as to enable a reader to identify; the antenna is in a communication connection with the chip so as to transmit a radio frequency signal between the chip and the reader; a connecting part is further provided on the substrate, the connecting part is a connecting hole or a connecting groove, and the antenna is connected to the substrate through the connecting part.

In an implementation mode, there are a plurality of connecting parts, there are a plurality of antennas, and the plurality of antennas are connected to the plurality of connecting parts in one-to-one correspondence.

In an implementation mode, there are two connecting parts, the two connecting parts are respectively provided at two opposite ends of the substrate, and the chip is located on the substrate between the two connecting parts, wherein one end of the antenna is connected to the connecting part, and the other end of the antenna extends in a direction away from the chip.

In an implementation mode, a clamping part is provided at one side of the connecting part, and a connecting end is provided at one end of the antenna, wherein the connecting end is inserted into the connecting part, and the clamping part is configured for positioning the connecting end in the connecting part.

In an implementation mode, the antenna is a spiral structure, the clamping part is an inclined plane, and the inclined plane and the spiral structure are connected to stop the connecting end within the connecting portion.

In an implementation mode, the inclined surface is provided on a side of the connecting part away from the chip.

In an implementation mode, the first side surface is provided at one end of the substrate close to the inclined surface, and the first side surface is arranged parallel to the inclined surface.

In an implementation mode, a distance between the inclined plane and the first side surface is less than or equal to a pitch of the antenna.

In an implementation mode, one end of the antenna is provided with a connecting end, and the connecting end is inserted in the connecting part and is welded to the substrate.

In an implementation mode, the antenna is a spiral structure, and the antenna further includes a signal transmission part, wherein the signal transmission part is configured for transmitting a radio frequency signal, and a pitch of the connecting end is different from a pitch of the signal transmission part.

According to another embodiment of the present invention, provided a processing method for an RFID, including: S1: placing a substrate on a prefabricated mold for fixing, and brushing solder paste on a solder plate of the substrate; S2: mounting a chip on the solder plate, and fixing one end of an antenna in a connecting part of a substrate, wherein the connecting part is a connecting hole or a connecting groove; S3: welding the chip on the substrate, and welding the antenna on the substrate; S4: removing the substrate from the prefabricated mold.

Further, there are a plurality of substrates in S1, and a plurality of mounting grooves are provided on the prefabricated mold, wherein the plurality of substrates are arranged in corresponding mounting grooves in one-to-one correspondence for fixing.

Further, S1 further includes: S11, after each substrate is fixed on the prefabricated mold, covering a screen plate on the prefabricated mold, wherein the screen plate has a plurality of avoidance grooves, and the plurality of avoidance grooves and the plurality of mounting grooves are provided in one-to-one correspondence, so as to wipe the corresponding substrate with the solder paste through the avoidance grooves on the screen plate.

The RFID tag in the present invention is mainly applied to a rubber product such as a tire and a conveyor belt. The RFID tag is inserted into the rubber product and is configured for recording some information of the rubber product. The RFID tag specifically includes a substrate, a chip and an antenna. The chip and the antenna are respectively arranged on the substrate. The chip includes a chip. The chip is provided with a unique predetermined code, so that a reader identifies information of the tire according to the predetermined code. The antenna is configured for transmitting information of the chip, and at the same time facilitates the reader to read the information of the chip. In the present invention, a connecting part is arranged on a substrate structure, the antenna penetrates through the connecting part and is connected to the substrate, a part of the antenna penetrating through the connecting part is located above the substrate, and a part of the antenna is located below the substrate. This connection manner is more stable than a form of being directly welded on the surface of the substrate before. The part of the antenna is arranged in a hole, increasing the tensile resistance of the antenna, reducing the thickness of the whole RFID tag, and facilitating installation. By means of the described arrangement, the problem in the related art that a substrate in an RFID tag is not reliably connected to an antenna is solved.

BRIEF DESCRIPTION OF THE DRAWINGS

The accompanying drawings, which form a part of the present invention, are configured for providing a further understanding of the present invention. The schematic embodiments and illustrations of the present invention are configured for explaining the present invention, and do not form improper limits to the present invention. In the drawings.

Figure 1:
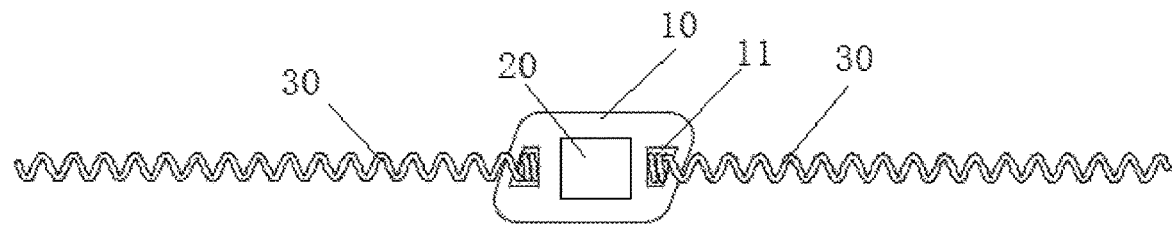
FIG. 1 is a schematic diagram showing a first view angle structure of an embodiment of an RFID tag according to the present invention.

The figures include the following reference signs:
  10: substrate; 11: connecting part; 12: first side surface; 111: clamping part; 20: chip; 30: antenna; 31: connecting end; 32: signal transmission section.

DETAILED DESCRIPTION OF THE EMBODIMENTS

It is important to note that the embodiments of the present disclosure and the characteristics in the embodiments can be combined under the condition of no conflicts. The present disclosure will be described below with reference to the drawings and embodiments in detail.

The present invention provides an RFID tag, which is applied to a rubber product such as a tire and a conveyor belt. Referring to FIG. 1 to FIG. 5, the RFID tag includes a substrate 10, a chip 20 and an antenna 30, wherein the chip 20 is disposed on the substrate 10, and a predetermined code is provided on the chip so as to enable a reader to identify; the antenna 30 is in a communication connection with the chip 20, and is configured for transmitting a radio frequency signal between the chip 20 and a reader; the substrate 10 is further provided with a connecting part 11, the connecting part 11 is a connecting hole or a connecting groove, and the antenna 30 is connected to the substrate 10 through the connecting part 11.

The RFID tag in the present invention is mainly applied to a tyre. The RFID tag is inserted into the tyre to record some information about the tyre. Specifically, the RFID tag includes a substrate, a chip and an antenna, wherein the chip and the antenna are respectively arranged on the substrate; the chip includes a chip; the chip is provided with a unique predetermined code so that a reader can identify information about the tyre according to the predetermined code; the antenna is configured for transmitting the information of the chip, and at the same time, the reader can read the information about the chip. The substrate structure in the present invention is provided with a connecting part 11; the antenna penetrates through the connecting part and is connected to the substrate; a part of the antenna penetrates through the connecting part and is located above the substrate; and a part of the antenna is located below the substrate. This connection manner is more stable than the form of being directly welded on the surface of the substrate before; and the part of the antenna is arranged in a hole, increasing the tensile property of the antenna, reducing the thickness of the whole RFID tag, and facilitating installation. By means of the described arrangement, the problem in the related art that a substrate in an RFID tag is not reliably connected to an antenna is solved.

There are a plurality of connecting parts 11; there are a plurality of antennas 30; and the plurality of antennas 30 are connected to the plurality of connecting parts 11 in one-to-one correspondence.

There are two connecting parts 11, the two connecting parts 11 are respectively arranged at two opposite ends of a substrate 10, and a chip 20 is located on the substrate 10 between the two connecting parts 11, wherein one end of an antenna 30 is connected to the connecting part 11, and the other end of the antenna 30 extends in a direction away from the chip 20.

Figure 3:
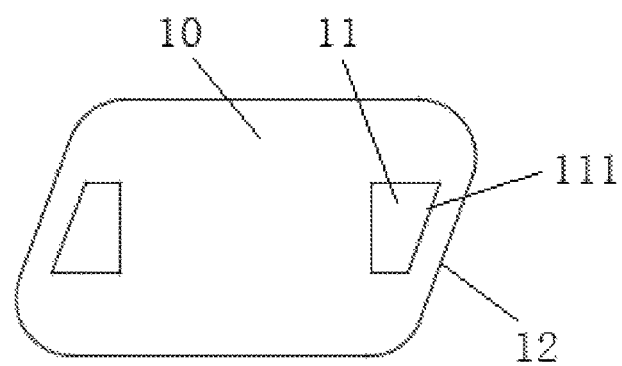
FIG. 3 shows a structural schematic diagram of a substrate in an embodiment in which a connecting part of an RFID tag in the present invention is a connecting hole.

As shown in FIGS. 1 and 3, in this embodiment, a chip is disposed at a middle part of a substrate, the two connecting parts are symmetrically disposed at two sides of the chip, and the connecting parts are disposed near the edge of the substrate, so as to facilitate connection with an antenna. One end of the antenna is disposed in the connecting part, and the other end extends in a direction away from the chip. In a thickness direction of the substrate, after the antenna is inserted in the connecting part, a partial thickness of the antenna coincides with a partial thickness of the substrate. Compared with a structure in the related art in which an antenna is directly welded on a surface of a substrate, the structure is thinner, and the substrate is further lighter when the connecting part is disposed.

One side of the connecting part 11 is provided with a clamping part 111, and one end of the antenna 30 is provided with a connecting end 31, wherein the connecting end 31 is inserted in the connecting part 11, and the clamping part 111 is configured for positioning the connecting end 31 in the connecting part 11. The antenna 30 is of a spiral structure, the clamping part 111 is an inclined plane, and the inclined plane and the spiral structure are connected to stop the connecting end 31 within the connecting part 11.

As shown in FIG. 3, a side wall of one side of the connecting part is provided with a clamping part 111 for positioning a part of the antenna located in the connecting part in the connecting part, so as to prevent the antenna from being separated.

Preferably, the connecting part is a right-angled trapezoidal hole; during installation, an end part of the antenna is opposite to a right-angled side of the right-angled trapezoidal hole; then, the antenna extends towards an oblique side direction of the right-angled trapezoidal hole; and during installation, the rotation direction of the antenna is consistent with the direction of the oblique side. In this way, the antenna can be conveniently installed, and at the same time, the pitch of each part of the antenna structure is protected to be consistent as far as possible, so as to prevent the antenna at the joint from being propped open and damage the structure of the antenna.

The inclined surface is provided at a side of the connecting part 11 away from the chip 20. One end of the substrate 10 close to the inclined surface is provided with a first side surface 12, and the first side surface 12 is arranged parallel to the inclined surface.

As shown in FIG. 3, in this embodiment, the inclined plane is disposed on one side close to the edge of the substrate, so as to facilitate cooperative connection with the antenna. Preferably, in order to facilitate installation of the antenna as much as possible, the first side surface 12 and the inclined plane are disposed in parallel. In this way, it can be ensured as far as possible that the thickness of the substrate between the first side surface and the inclined plane is consistent, so that the antenna can be clamped at this position exactly and does not deform without an external force.

The distance between the inclined surface and the first side surface 12 is not more than a pitch of the antenna 30.

Figure 4:
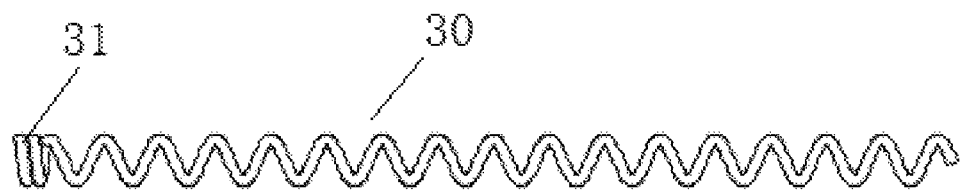
FIG. 4 shows a schematic diagram of an antenna structure in an RFID tag embodiment of the present invention.

As shown in FIGS. 3 and 4, in order to prevent the antenna from being deformed when it is not subjected to an external stretching force, the thickness of the substrate between the inclined plane and the first side surface is less than the pitch of the antenna. This will prevent the antenna from being stretched and reduce deformation.

One end of the antenna 30 is provided with a connecting end 31, and the connecting end 31 is inserted in the connecting part 11 and is connected to the substrate 10 by welding.

As shown in FIG. 4, in this embodiment, a connecting end is arranged at one end of an antenna, and the connecting end specifically inserted into a connecting part, the shape of the connecting end matches the shape of the connecting part, an end part of the antenna is arranged as a plane so as to abut against one side of the connecting part, and after the connecting end of the antenna is inserted in the connecting part, the part where the antenna is in contact with a substrate is welded and fixed, thereby ensuring that the connecting end does not leave the connecting part.

The antenna 30 is of a spiral structure, and the antenna 30 further includes a signal transmission part 32, wherein the signal transmission part 32 is configured for transmitting a radio frequency signal, and the screw pitch at the connecting end 31 is different from the screw pitch at the signal transmission part 32.

Optionally, in this embodiment, the screw pitch of the connecting end is smaller than that of the signal transmission part 32, so that the connecting end is clamped in the connecting hole.

The present invention also provides processing method for an RFID tag, including: S1: placing a substrate 10 on a prefabricated mold for fixing, and brushing a solder paste on a solder plate of the substrate 10; S2: mounting a chip 20 on a solder plate, and fixing one end of an antenna 30 in a connecting part 11 of a substrate 10, wherein the connecting part 11 is a connecting hole or a connecting groove; S3: welding the chip 20 on the substrate 10, and welding the antenna 30 on the substrate 10; S4: removing the substrate 10 from the prefabricated mold.

The processing method for an RFID tag of the present invention includes:
1) After splicing the substrate, fixing the substrate on a prefabricated mold, and using a corresponding screen plate, and brushing a uniform solder paste at a solder plate;
2) Automatically placing a chip by passing the substrate printed with the solder paste through an SMT device;
3) Placing the antenna in a fixed position by means of a manual or automatic device, and using a prefabricated mold to press down, so as to ensure that the antenna is clamped in the connecting hole or the connecting groove;
4) Enabling the solder paste to melt sufficiently by means of reflow soldering so as to effectively fix a chip, a substrate and an antenna;
5) Performing splitting by means of a prefabricated mold, so as to obtain an independent RFID electronic tag.

In S1, there are a plurality of substrates 10, and the prefabricated mold is provided with a plurality of mounting grooves, wherein the substrates 10 are arranged in the corresponding mounting grooves in one-to-one correspondence for fixing.

S1 further includes: S11: after each substrate 10 is fixed onto a prefabricated mold, covering a screen plate on the prefabricated mold, wherein the screen plate has a plurality of avoidance grooves, and the plurality of avoidance grooves and the plurality of mounting grooves are provided in one-to-one correspondence, so that a tin paste is printed on the corresponding substrate 10 through the avoidance grooves on the screen plate.

The size of a corresponding accommodating groove on the screen plate is less than the size of the mounting groove.

The present invention also provides a tire, including a tire body and an RFID tag, wherein the RFID tag is provided inside the tire body, and the RFID tag is the described RFID tag.

The present invention further provides a tire. The tire is provided with the described RFID tag therein.

Figure 5:
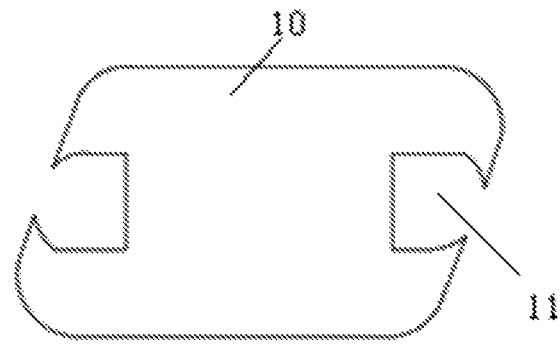
FIG. 5 shows a structural schematic diagram of a substrate in an embodiment in which a connecting part of an RFID tag of the present invention is a connection groove.

In addition, as shown in FIG. 5, the substrate is not limited to be provided with a connecting hole for connection with an antenna, and may also be replaced with a connecting groove, etc., wherein the connecting groove is provided at an edge position of the substrate.

Preferably, the connecting groove is a C-shaped groove.

From the above description, it can be seen that the above embodiments of the present invention achieve the following technical effects: The RFID tag of the present invention includes an IC chip; two ends of a substrate carrying the IC chip are perforated; the width of an aperture is equivalent to or slightly wider than the outer diameter of an antenna, so as to facilitate insertion of one end of the antenna into a hole; the angle of an edge of the substrate is consistent with the direction of an antenna pitch line clamped on the upper edge of the substrate; the pitch of the antenna welding end is designed to enable a part of the pitch of the antenna welding end to be clamped at the opening of the screen plate bearing the RFID chip. In this way, the antennas at the two ends are clamped on the substrate, and the RFID tag pulling force is increased by welding (or in other manners).

Meanwhile, the antenna sinks into the connecting part of the substrate, the overall thickness of the RFID tag is equal to the outer diameter of the antenna, and the thickness is obviously reduced.

The RFID tag of the present invention has a reduced thickness, and can be applied to thin rubber products, such as semi-steel tires; by means of structural changes, the pulling force of the RFID tag is improved, and the robustness of the RFID tag is enhanced.

Figure 2:
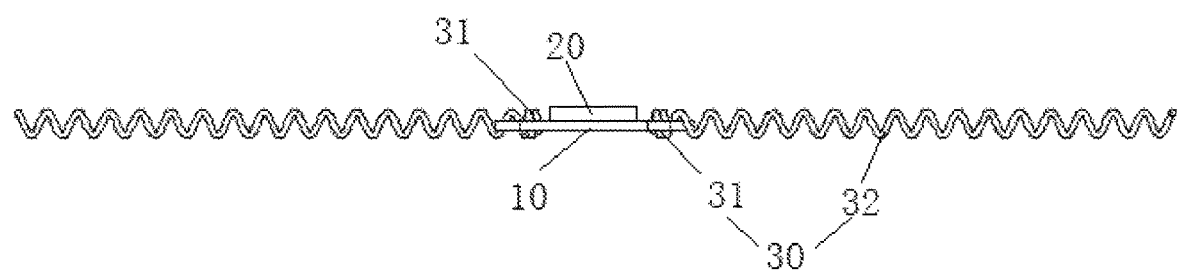
FIG. 2 is a schematic diagram showing a second viewing angle according to an embodiment of an RFID tag of the present invention.

As shown in FIGS. 2 and 3, the RFID tag encapsulation described in the present invention is not limited to a cylindrical encapsulation form, and an inner pin adopts a pin-shaped structure, so as to increase the security of the pin; the pin material should be a conductor with good ductility and plasticity, and the antenna structure may be wound into a spiral shape or folded into a triangular shape or other shapes according to requirements.

What is claimed is:

1. An RFID tag, being used in a tire structure, the RFID tag comprising:
    a substrate (10);
    a chip (20), disposed on the substrate (10), wherein a predetermined code is provided on the chip so as to enable a reader to identify;
    an antenna (30), communicatively connected to the chip (20) and configured to transmit a radio frequency signal between the chip (20) and the reader;
    wherein the substrate (10) is further provided with a connecting part (11), the connecting part (11) is a connecting hole or a connecting groove, the antenna (30) is connected to the substrate (10) through the connecting part (11);
    wherein one side of the connecting part (11) is provided with a clamping part (111), one end of the antenna (30) is provided with a connecting end (31), the connecting end (31) is inserted in the connecting part (11), and the clamping part (111) is configured for positioning the connecting end (31) in the connecting part (11); and
    wherein the antenna (30) is a spiral structure, the clamping part (111) is an inclined plane, and the inclined plane and the spiral structure are connected to stop the connecting end (31) within the connecting part (11).

2. The RFID tag as claimed in claim 1, wherein there are a plurality of connecting parts (11), there are a plurality of antennas (30), and the plurality of antennas (30) are connected to the plurality of connecting parts (11) in one-to-one correspondence.

3. The RFID tag as claimed in claim 1, wherein there are two connecting parts (11), the two connecting parts (11) are respectively provided at two opposite ends of the substrate (10), the chip (20) is located on the substrate (10) between the two connecting parts (11), one end of the antenna (30) is connected to the connecting part (11), and the other end of the antenna (30) extends in a direction away from the chip (20).

4. The RFID tag as claimed in claim 1, wherein the inclined plane is provided at a side of the connecting part (11) away from the chip (20).

5. The RFID tag as claimed in claim 4, wherein a first side surface (12) is provided at one end of the substrate (10) close to the inclined surface, and the first side surface (12) is provided parallel to the inclined surface.

6. The RFID tag as claimed in claim 5, wherein a distance between the inclined plane and the first side surface (12) is not more than a pitch of the antenna (30).

7. The RFID tag as claimed in claim 1, wherein one end of the antenna (30) is provided with a connecting end (31), and the connecting end (31) is inserted in the connecting part (11) and is welded to the substrate (10).

8. The RFID tag as claimed in claim 7, wherein the antenna (30) is a spiral structure, the antenna (30) further comprises a signal transmission part (32), the signal transmission part (32) is configured for transmitting a radio frequency signal, and a pitch of the connecting end (31) is different from a pitch of the signal transmission part (32).

9. A processing method for an RFID tag, comprising:
    S1: placing a substrate (10) on a prefabricated mold for fixing, and brushing solder paste on a solder plate of the substrate (10);
    S2: mounting a chip (20) on the solder plate, and fixing one end of an antenna (30) in a connecting part (11) of the substrate (10), wherein the connecting part (11) is a connecting hole or a connecting groove;
    S3: welding the chip (20) on the substrate (10), and welding the antenna (30) on the substrate (10);
    S4: removing the substrate (10) from the prefabricated mold;
    wherein one side of the connecting part (11) is provided with a clamping part (111), one end of the antenna (30) is provided with a connecting end (31), the connecting end (31) is inserted in the connecting part (11), and the clamping part (111) is configured for positioning the connecting end (31) in the connecting part (11); and
    wherein the antenna (30) is a spiral structure, the clamping part (111) is an inclined plane, and the inclined plane and the spiral structure are connected to stop the connecting end (31) within the connecting part (11).

10. The processing method for an RFID tag as claimed in claim 9, wherein there are a plurality of substrates (10) in S1, and a plurality of mounting grooves are provided on the prefabricated mold, the plurality of substrates (10) are arranged in corresponding mounting grooves in one-to-one correspondence for fixing.

11. The processing method for an RFID tag as claimed in claim 10, wherein the S1 further comprising:
    S11: after each substrate (10) is fixed on the prefabricated mold, covering a screen plate on the prefabricated mold, wherein the screen plate has a plurality of avoidance grooves, and the plurality of avoidance grooves and the plurality of mounting grooves are provided in one-to-one correspondence, so as to wipe the corresponding substrate (10) with solder paste through the avoidance grooves on the screen plate.

* * * * *